US006990745B1

(12) United States Patent
Schoenenberger

(10) Patent No.: US 6,990,745 B1
(45) Date of Patent: Jan. 31, 2006

(54) TRAILER HITCH ALIGNMENT SYSTEM

(76) Inventor: Dennis W. Schoenenberger, 6399 Hillview Drive, Kamloops, BC (CA) V2C 4Y2

( * ) Notice: Subject to any disclaimer, the term of this patent is extended or adjusted under 35 U.S.C. 154(b) by 149 days.

(21) Appl. No.: 10/818,813

(22) Filed: Apr. 5, 2004

(51) Int. Cl.
*G01B 3/10* (2006.01)

(52) U.S. Cl. ............................ 33/760; 33/264; 33/296; 280/477

(58) Field of Classification Search .................. 33/760, 33/767, 264, 755, 758–759, 483, 494, 373, 33/296, 809; 280/477, 762, 432, 766; 116/28 R, 116/35 R See application file for complete search history.

(56) References Cited

U.S. PATENT DOCUMENTS

| | | | | |
|---|---|---|---|---|
| 3,443,316 | A * | 5/1969 | Edgell | 33/767 |
| 3,691,642 | A * | 9/1972 | Nolte et al. | 33/193 |
| 3,858,966 | A * | 1/1975 | Lowell, Jr. | 359/881 |
| 3,921,958 | A | 11/1975 | Brockelsby et al. | |
| 4,541,183 | A * | 9/1985 | McConnell | 33/264 |
| 4,666,176 | A * | 5/1987 | Sand | 280/477 |
| 4,911,460 | A | 3/1990 | DePaula | |
| 5,009,444 | A | 4/1991 | Williams, Jr. | |
| 5,067,746 | A | 11/1991 | Baker | |
| 5,184,839 | A | 2/1993 | Guedry | |
| 5,340,143 | A | 8/1994 | Williams, Jr. | |
| 5,409,251 | A | 4/1995 | Thorndyke | |
| 5,690,348 | A | 11/1997 | Williams, Jr. | |
| 5,984,353 | A | 11/1999 | Rasmussen | |
| 6,145,813 | A | 11/2000 | Anderson | |
| 6,168,181 | B1 * | 1/2001 | Gadd | 280/477 |
| 6,425,604 | B1 | 7/2002 | Schubert et al. | |
| 6,726,236 | B2 * | 4/2004 | Cofer | 280/475 |
| 6,726,247 | B1 * | 4/2004 | Snyder | 280/766.1 |
| 6,760,974 | B1 * | 7/2004 | Jorgenson | 33/296 |
| 2003/0122347 | A1 | 7/2003 | Walters | |

* cited by examiner

*Primary Examiner*—G. Bradley Bennett
*Assistant Examiner*—Tania Courson

(57) ABSTRACT

A trailer hitch alignment system for efficiently connecting a trailer to a vehicle. The trailer hitch alignment system includes a housing structure with a measuring member extendable from the housing structure, a securing member for securing the housing structure to an upper leg portion of a leg of a trailer, a pointer member attached to a distal end of the measuring member, and an indicator line attached to a telescoping portion of the leg. The pointer member is aligned with the indicator line when the trailer is attached to the vehicle and thereafter indicates the proper height of the trailer for connecting the hitch of the trailer at a later time.

12 Claims, 12 Drawing Sheets

TRAILER HITCH ALIGNMENT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to trailer hitch alignment devices and more specifically it relates to a trailer hitch alignment system for efficiently connecting a trailer to a vehicle.

2. Description of the Related Art

Trailers, such as fifth wheel trailers, have been in use for years. A conventional trailer has a hitch that is removably attachable to a pin or ball attached to the vehicle. To attach the trailer to the vehicle, the user must either have a second person to assist them or they must leave the vehicle repeatedly to adequately align the hitch of the trailer (both vertically and horizontally). With a fifth wheel trailer, it is important to have the height of the trailer hitch properly aligned so that the hitch can slidably receive the pin on the vehicle as shown in FIG. 11 of the drawings. Some products currently commercially available are comprised of magnetic flag members that attach to the trailer and the vehicle. However, these devices are not as suitable for use in vertically aligning a trailer hitch.

While these devices may be suitable for the particular purpose to which they address, they are not as suitable for efficiently connecting a fifth wheel trailer to a vehicle. Conventional In these respects, the trailer hitch alignment system according to the present invention substantially departs from the conventional concepts and designs of the prior art, and in so doing provides an apparatus primarily developed for the purpose of efficiently connecting a fifth wheel trailer to a vehicle.

BRIEF SUMMARY OF THE INVENTION

In view of the foregoing disadvantages inherent in the known types of trailer hitch alignment systems now present in the prior art, the present invention provides a new trailer hitch alignment system construction wherein the same can be utilized for efficiently connecting a fifth wheel trailer to a vehicle.

The general purpose of the present invention, which will be described subsequently in greater detail, is to provide a new trailer hitch alignment system that has many of the advantages of the trailer hitch alignment systems mentioned heretofore and many novel features that result in a new trailer hitch alignment system which is not anticipated, rendered obvious, suggested, or even implied by any of the prior art trailer hitch alignment systems, either alone or in any combination thereof.

To attain this, the present invention generally comprises a housing structure with a measuring member extendable from the housing structure, a securing member for securing the housing structure to an upper leg portion of a leg of a trailer, a pointer member attached to a distal end of the measuring member, and an indicator line attached to a telescoping portion of the leg. The pointer member is aligned with the indicator line when the trailer is attached to the vehicle and thereafter indicates the proper height of the trailer for connecting the hitch of the trailer at a later time.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a trailer hitch alignment system that will overcome the shortcomings of the prior art devices.

A second object is to provide a trailer hitch alignment system for efficiently connecting a fifth wheel trailer to a vehicle.

Another object is to provide a trailer hitch alignment system that may be utilized upon various types of trailers.

An additional object is to provide a trailer hitch alignment system that decreases the amount of time required to connect a fifth wheel trailer.

A further object is to provide a trailer hitch alignment system that easily aligns the vertical position of the hitch and pin.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
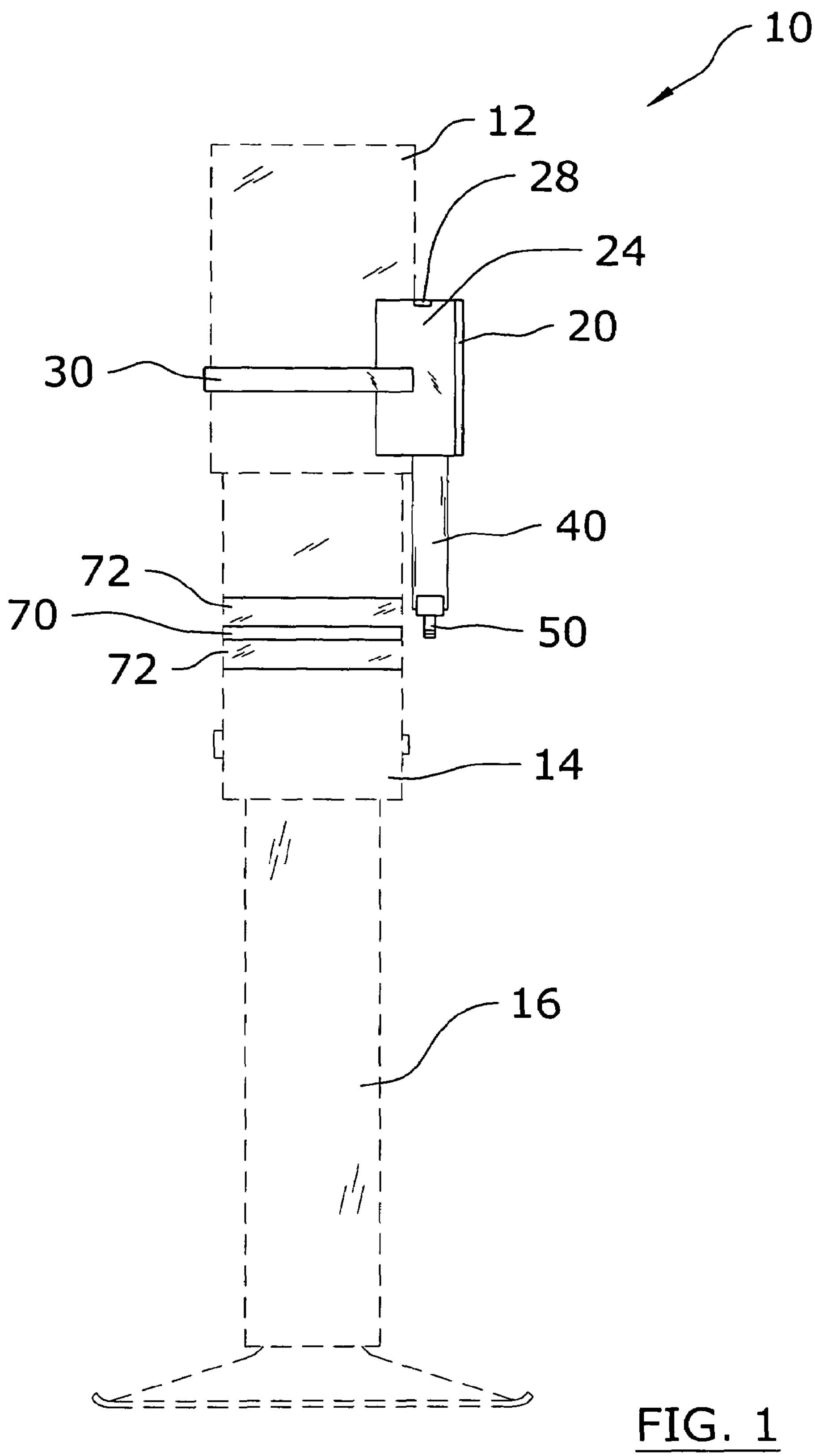
FIG. 1 is a front view of the present invention attached to a trailer leg with the pointer member aligned with the indicator line.

Turning now descriptively to the drawings, in which similar reference characters denote similar elements throughout the several views, FIGS. 1 through 12 illustrate a trailer hitch alignment system 10, which comprises a housing structure 20 with a measuring member 40 extendable from the housing structure 20, a securing member 30 for securing the housing structure 20 to an upper leg portion 12 of a leg of a trailer 19, a pointer member 50 attached to a distal end of the measuring member 40, and an indicator line 70 attached to a telescoping portion 14 of the leg. The leg of the trailer 19 typically has an upper leg portion 12, a telescoping portion 14 telescoping from the upper leg portion 12 and a lower leg portion 16 adjustably positioned within the telescoping portion 14. The pointer member 50 is aligned with the indicator line 70 when the trailer 19 is attached to the vehicle and thereafter indicates the proper height of the trailer 19 for connecting the hitch of the trailer 19 at a later time.

B. Housing Structure

Figure 2:
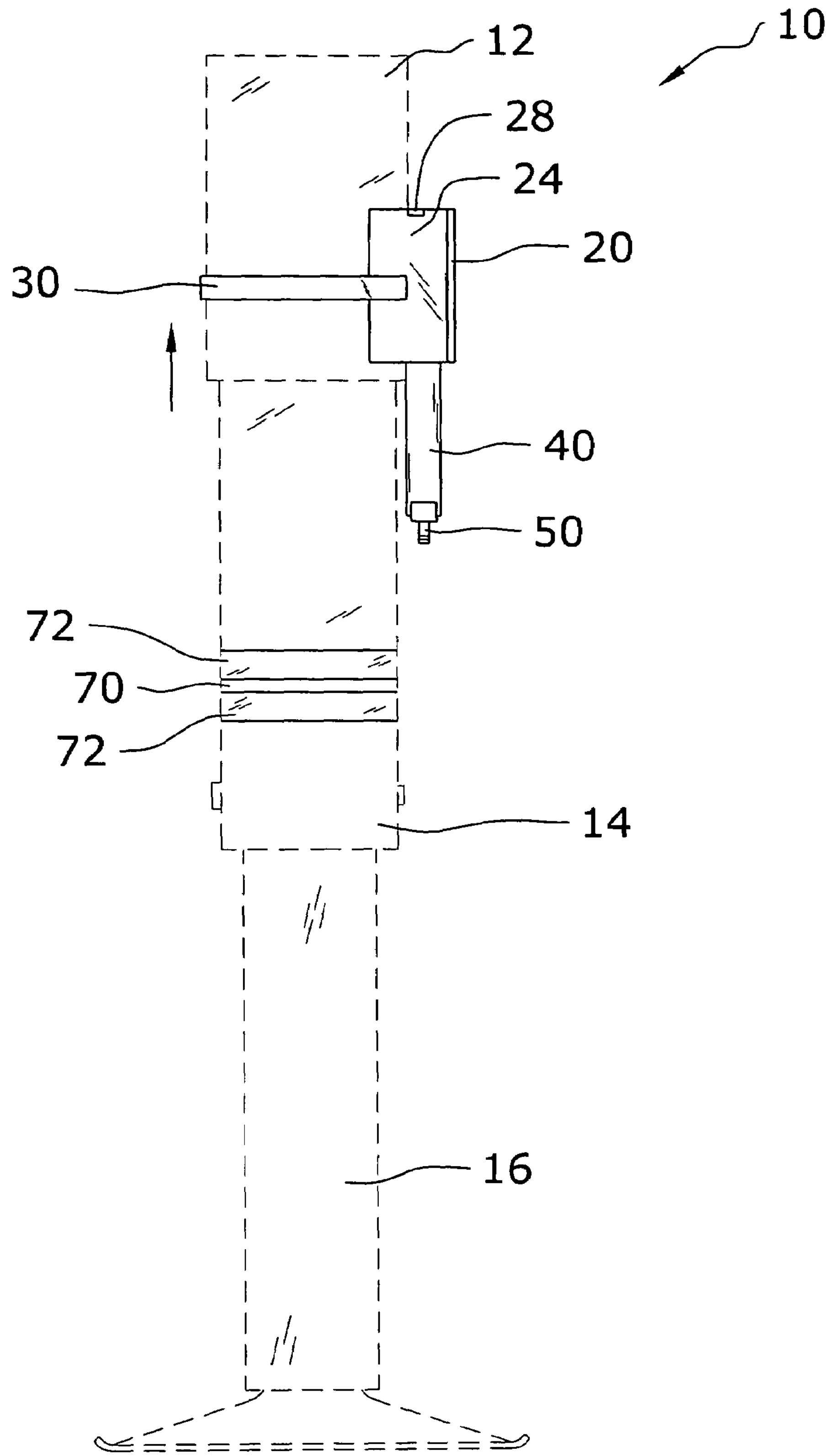
FIG. 2 is a front view of the present invention attached to the trailer leg with the trailer leg elevated.
Figure 3:
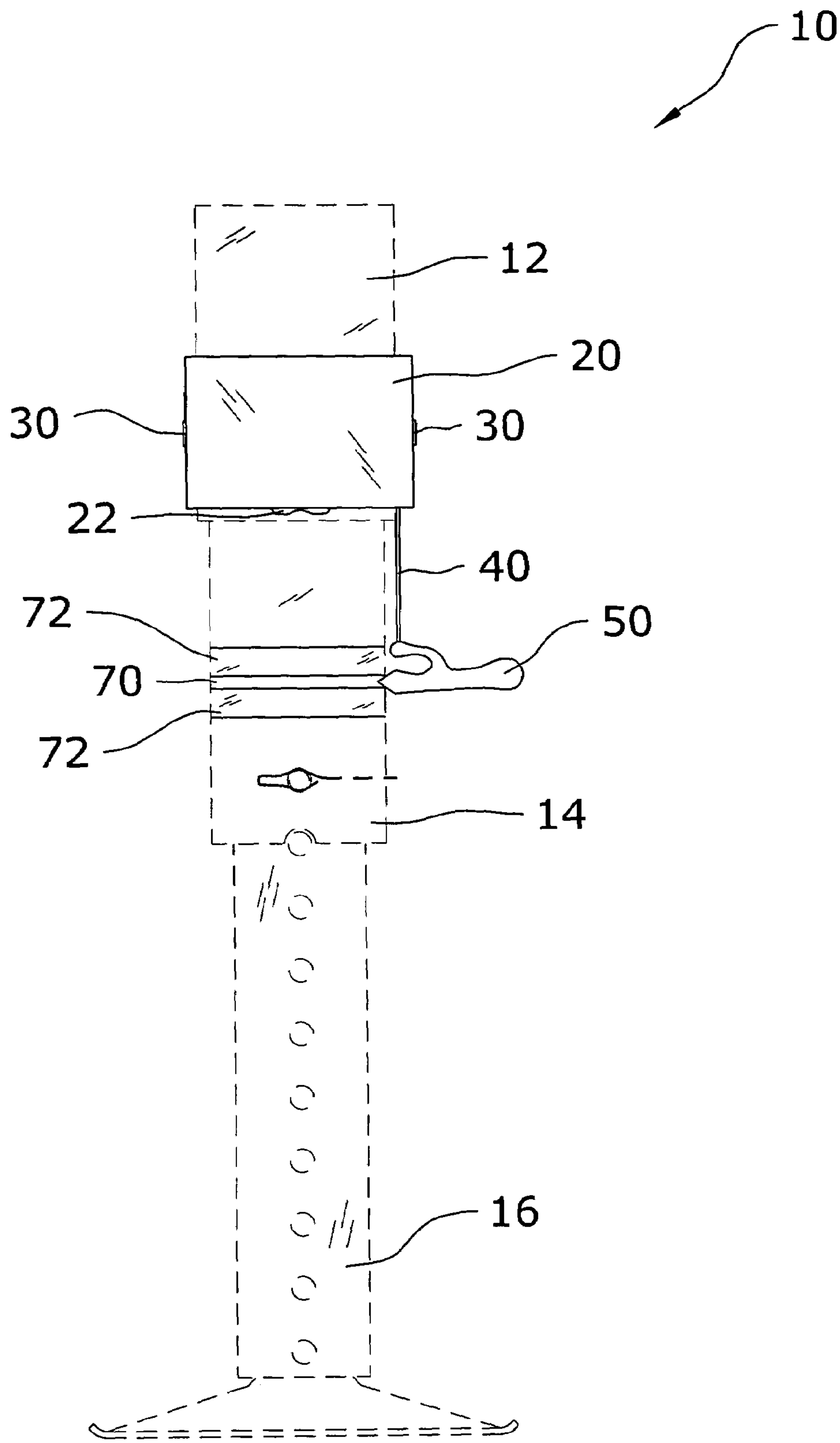
FIG. 3 is a side view of the present invention attached to the trailer leg with the pointer member aligned with the indicator line.

The housing structure 20 is attachable to a support leg of a trailer 19 as shown in FIGS. 1 through 3 of the drawings. A securing member 30 secures the housing structure 20 to an upper leg portion 12 of the leg as further shown in FIGS. 1 through 6 of the drawings.

Figure 4:
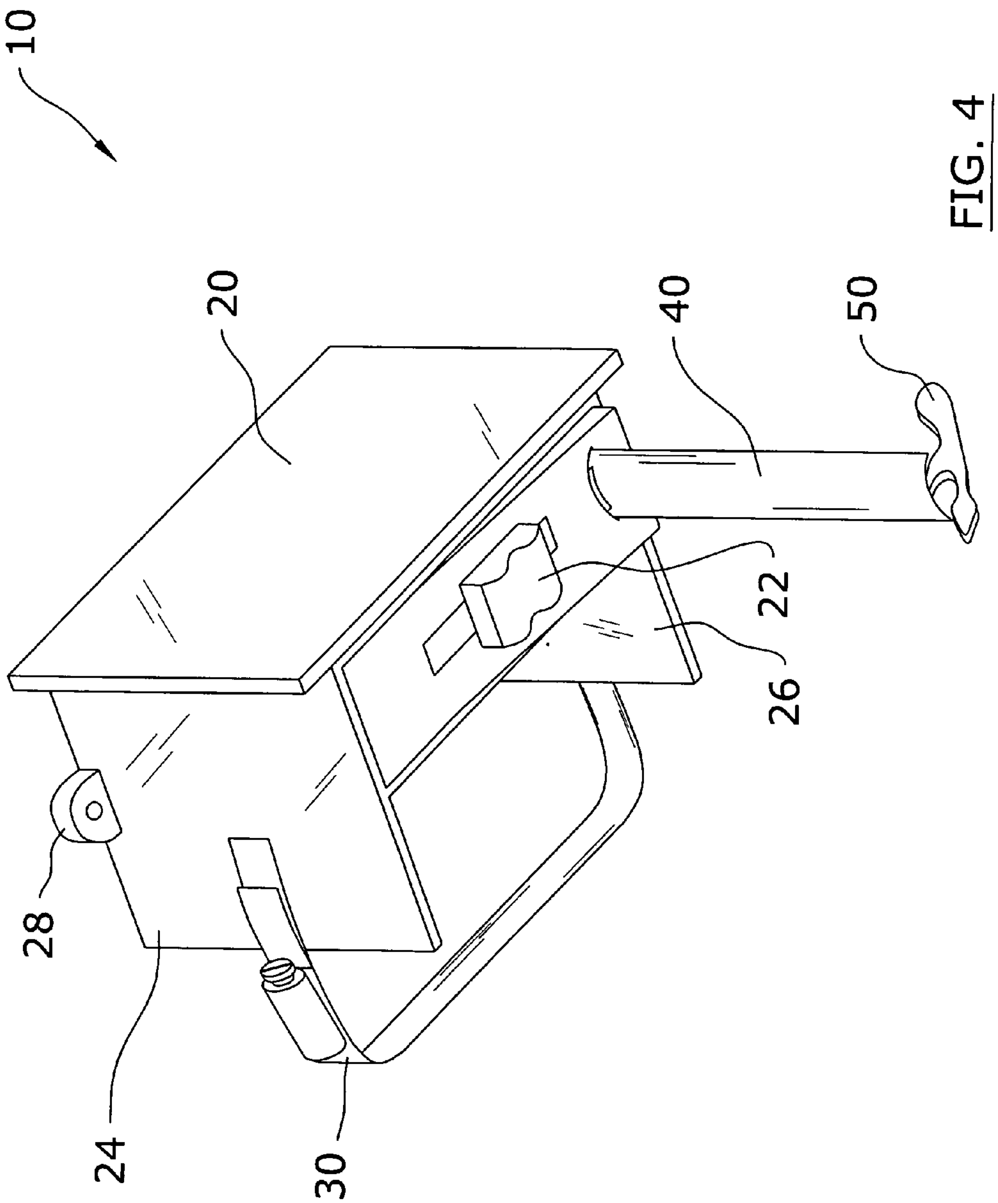
FIG. 4 is a lower perspective view of the present invention.

The securing member 30 may be comprised of various fastener structures such as but not limited to a band structure or a fastener structure. The securing member 30 preferably is attached to the first side 24 and the second side 26 of the housing structure 20 for extending about the rear portion of the upper leg portion 12. The securing member 30 may have a rectangular or curved structure as shown in FIGS. 4 and 5 of the drawings.

As shown in FIGS. 4 through 7 of the drawings, the housing structure 20 may include a plurality of mounting flanges 28 that each have an aperture. The mounting flanges 28 receive fasteners that extend into the hitch of the trailer 19.

The housing structure 20 includes a first side 24 and a second side 26 for being positioned upon sides of an upper leg portion 12 as shown in FIGS. 1 and 2 of the drawings. The first side 24 and the second side 26 preferably extend from the housing structure 20 to form a U-shaped structure for receiving an upper leg portion 12 having a rectangular cross sectional shape as best illustrated in FIG. 7 of the drawings.

Figure 5:
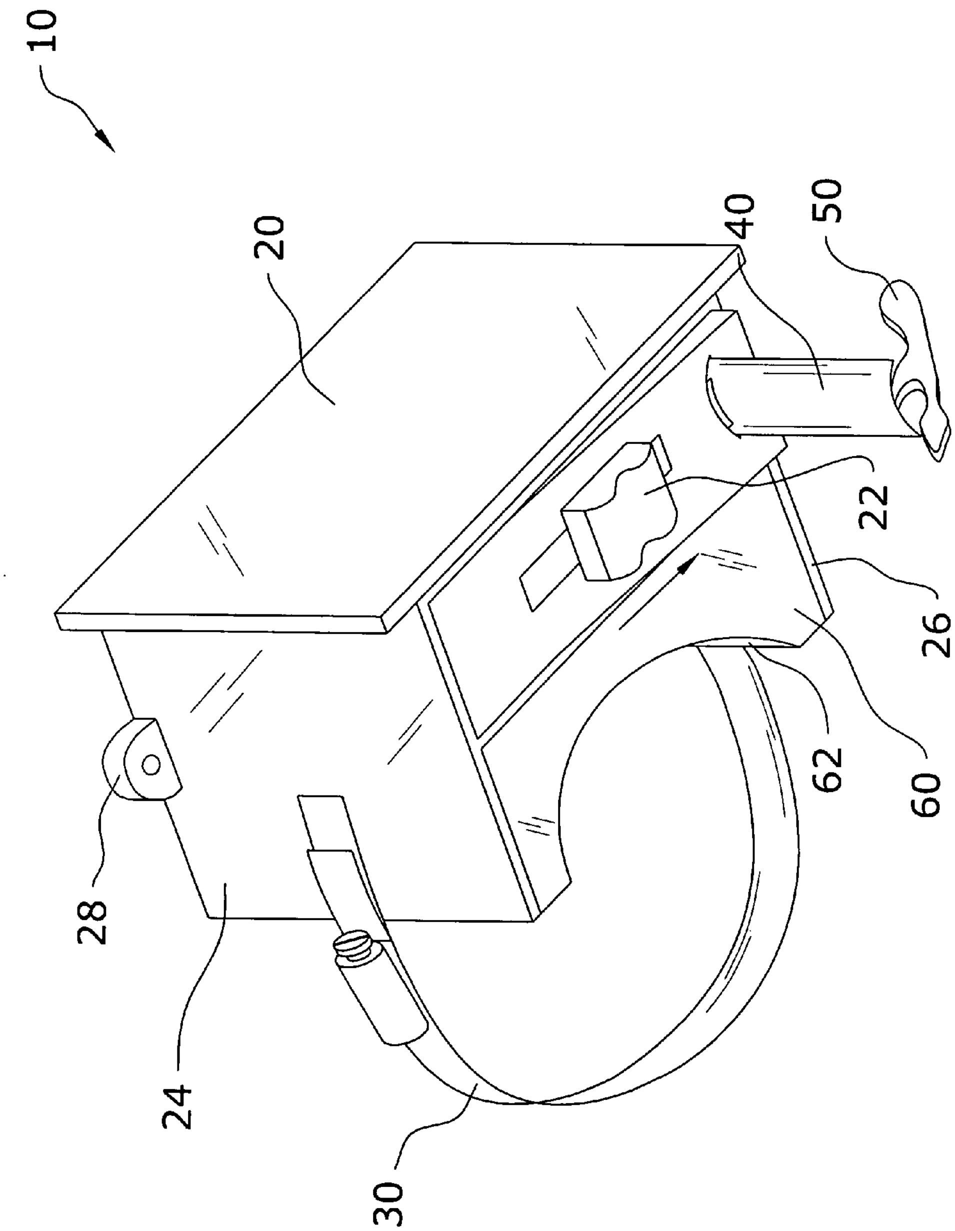
FIG. 5 is a lower perspective view of the present invention with a spacer member.
Figure 6:
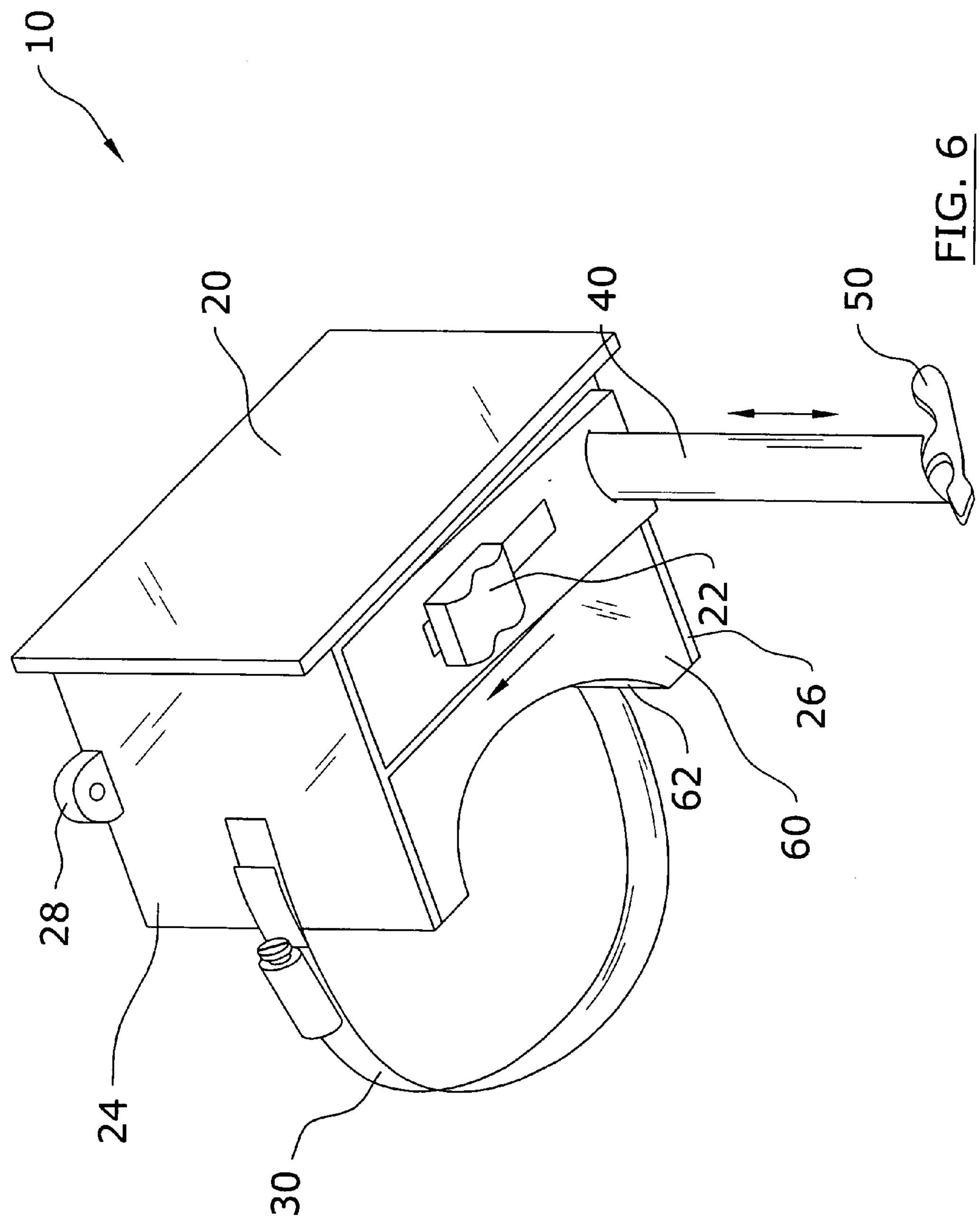
FIG. 6 is a lower perspective view of the present invention of the present invention with the measuring member extended from the housing structure.
Figure 7:
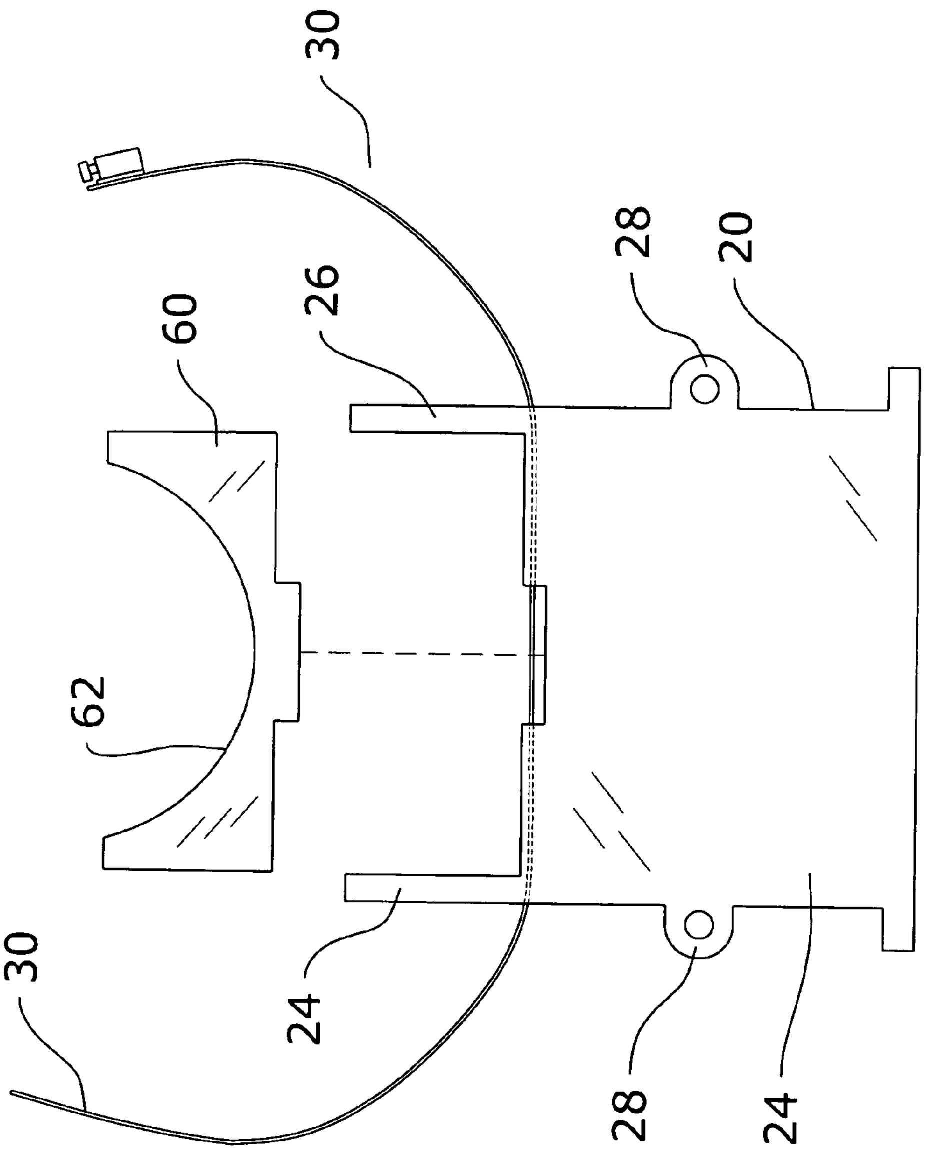
FIG. 7 is a top view of the present invention.
Figure 8:
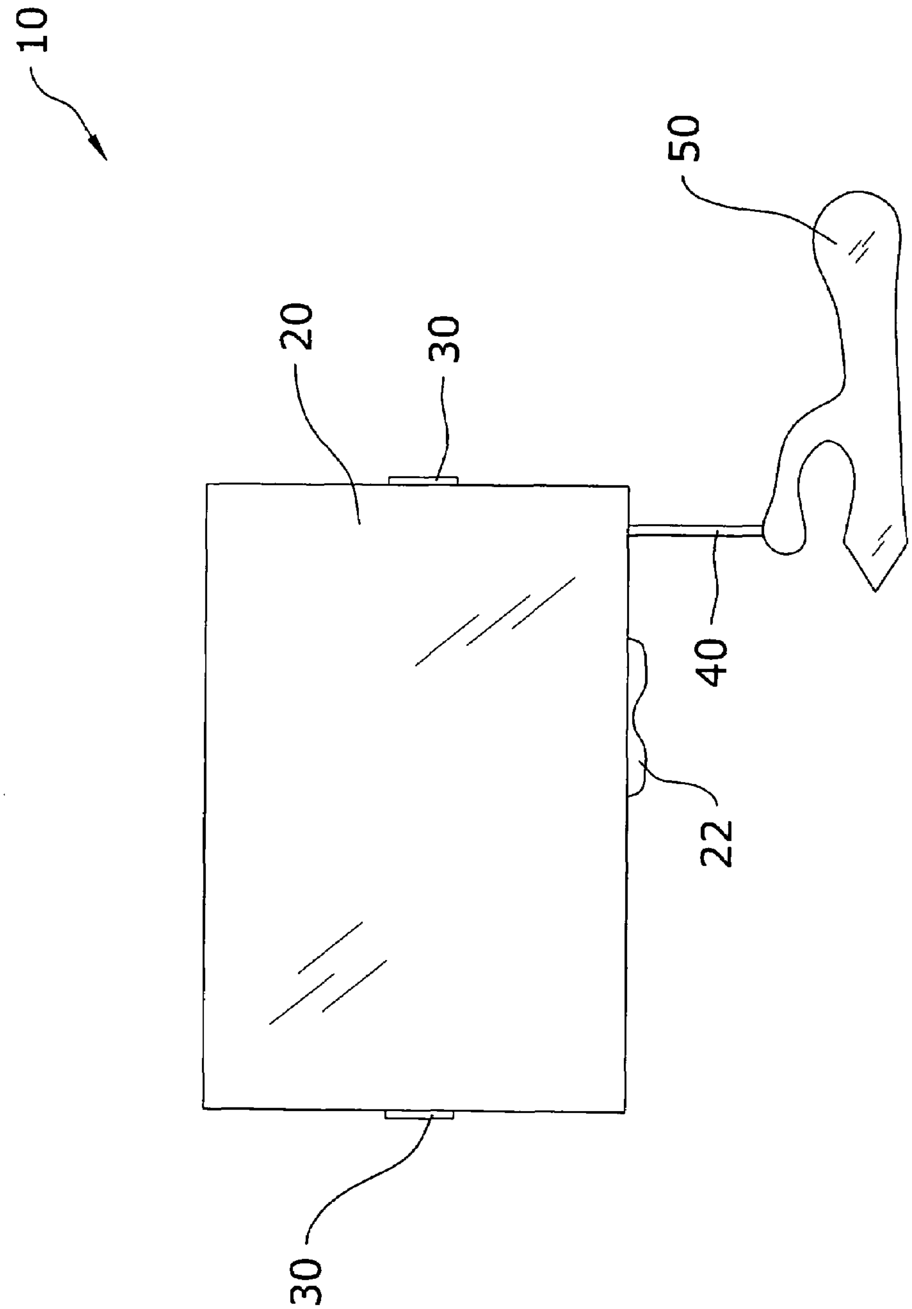
FIG. 8 is a side view of the present invention.
Figure 9:
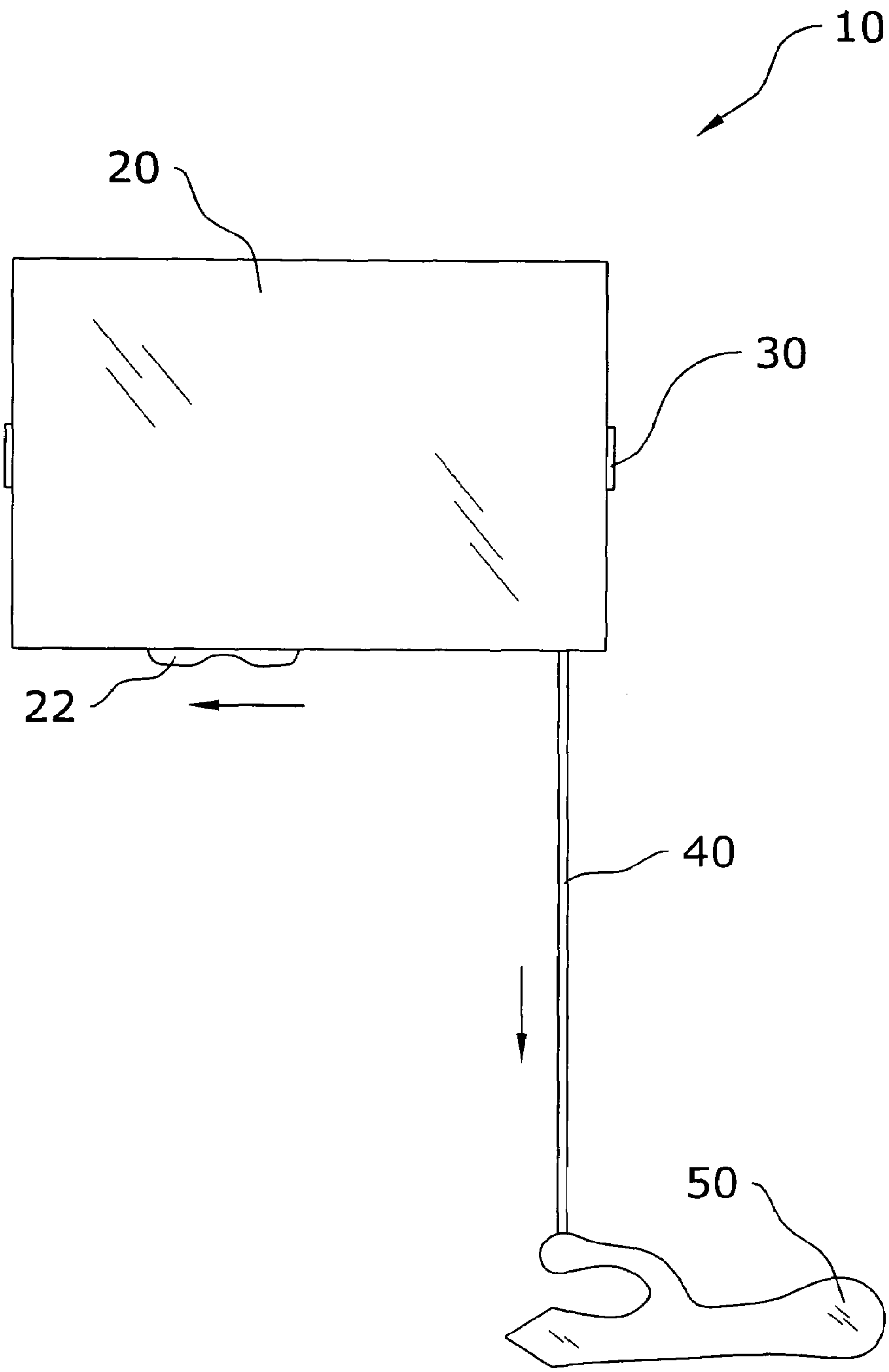
FIG. 9 is a side view of the present invention with the measuring member and pointer member extended from the housing structure.

FIGS. 5 through 7 of the drawings illustrate a spacer member 60 having a concave depression 62 positionable between the first side 24 and the second side 26 of the housing structure 20. The spacer member 60 allows the housing structure 20 to be attached to an upper leg portion 12 having a circular cross sectional shape.

C. Measuring Member

The housing structure 20 preferably includes a coil unit for dispensing and retracting a length of a measuring member 40. The coil unit may have a spring actuated coil for retracting the measuring member 40 into the housing structure 20. The measuring member 40 is preferably comprised of an elongated flexible member such as a tape measure. A locking button 22 is preferably connected to the coil unit within the housing structure 20 for selectively locking and releasing a position of the measuring member 40.

D. Pointer Member

A pointer member 50 is attached to a distal end of the measuring member 40 as best illustrated in FIGS. 1 through 6 of the drawings. The pointer member 50 may be comprised of various pointer structures capable of being aligned with the indicator line 70.

Figure 10:
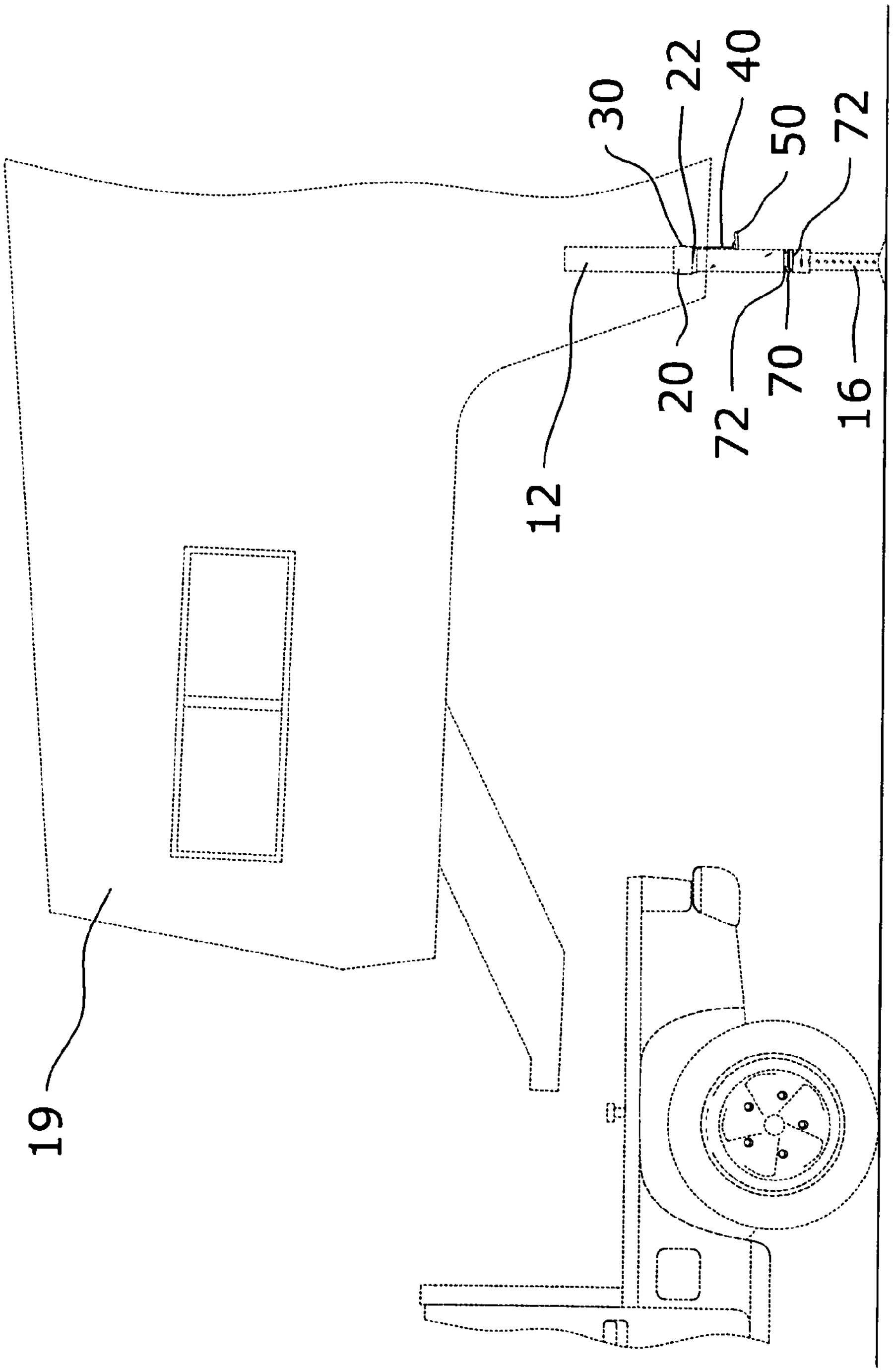
FIG. 10 is a side view of the present invention attached to the trailer leg with the trailer elevated above the desired height.

For example, the pointer member 50 is aligned with the indicator line 70 when a trailer 19 is at a desired vertical height as illustrated in FIGS. 1 and 3 of the drawings. If the trailer 19 is not at a desired vertical height, the pointer member 50 is either above or below the indicator line 70 thereby indicating a misalignment of the trailer 19 hitch with the ball or pin of the vehicle as shown in FIGS. 2 and 10 of the drawings.

E. Indicator Line

The indicator line 70 is attachable to a telescoping portion 14 of a leg of a trailer 19 as best illustrated in FIGS. 1 through 3 of the drawings. The indicator line 70 may be comprised of tape, band members or various other structures. The indicator line 70 may also be directly painted upon the upper leg portion 12. The indicator line 70 may also be integrally formed within the upper leg portion 12.

The indicator line 70 is preferably horizontally aligned upon the upper leg portion 12 of the support leg. A pair of outer lines 72 may surround the indicator line 70 as further shown in FIGS. 1 through 3 to provide additional guidance and visibility for the pointer member 50.

F. Operation of Invention

In use, the user first attaches the housing structure 20 to an upper leg portion 12 of a support leg of a trailer 19 as shown in FIGS. 1 through 3 of the drawings. The indicator line 70 is then attached to a telescoping portion 14 of the support leg as shown in FIGS. 1 through 3 of the drawings.

Figure 11:
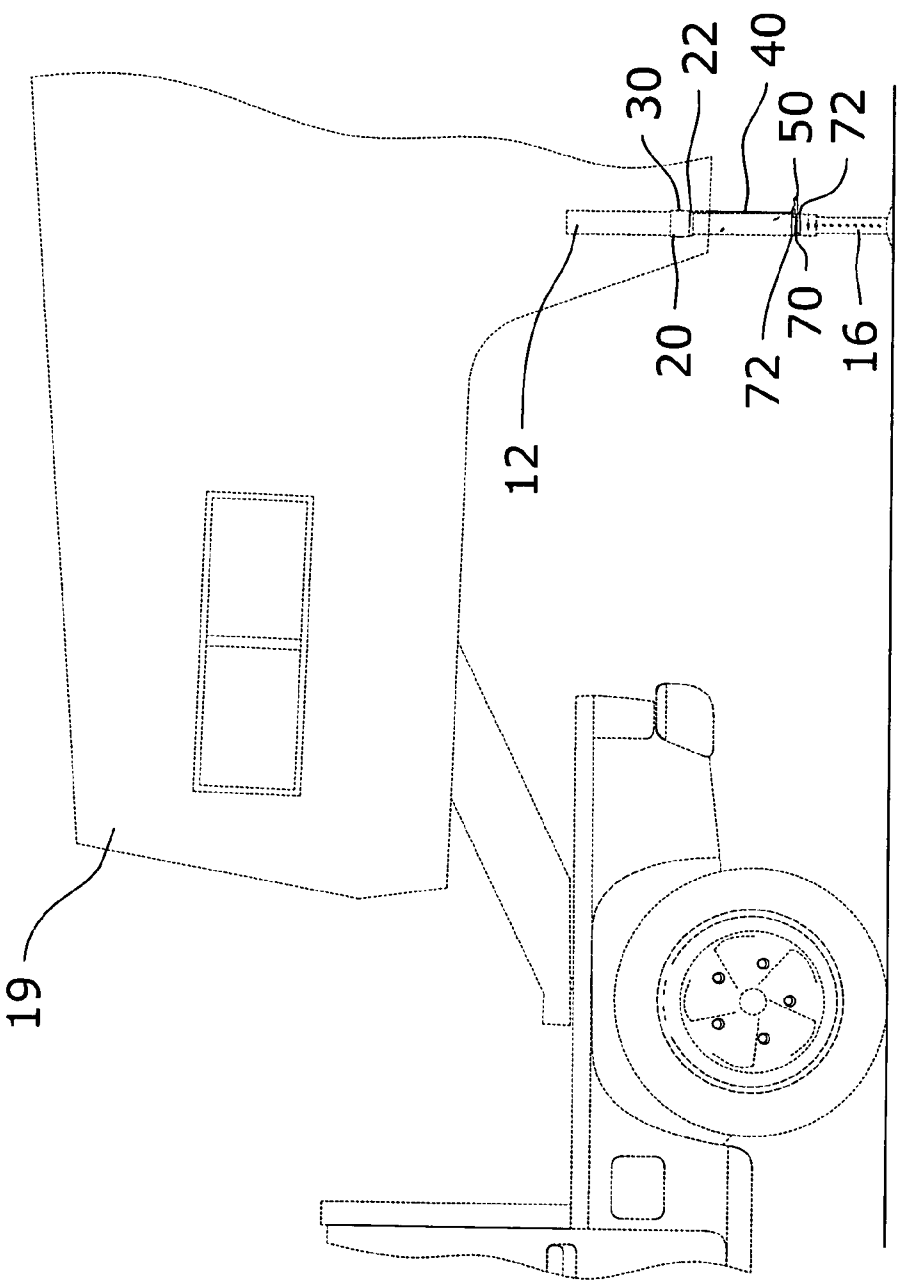
FIG. 11 is a side view of the present invention attached to the trailer leg with the trailer elevated to the desired height.
Figure 12:
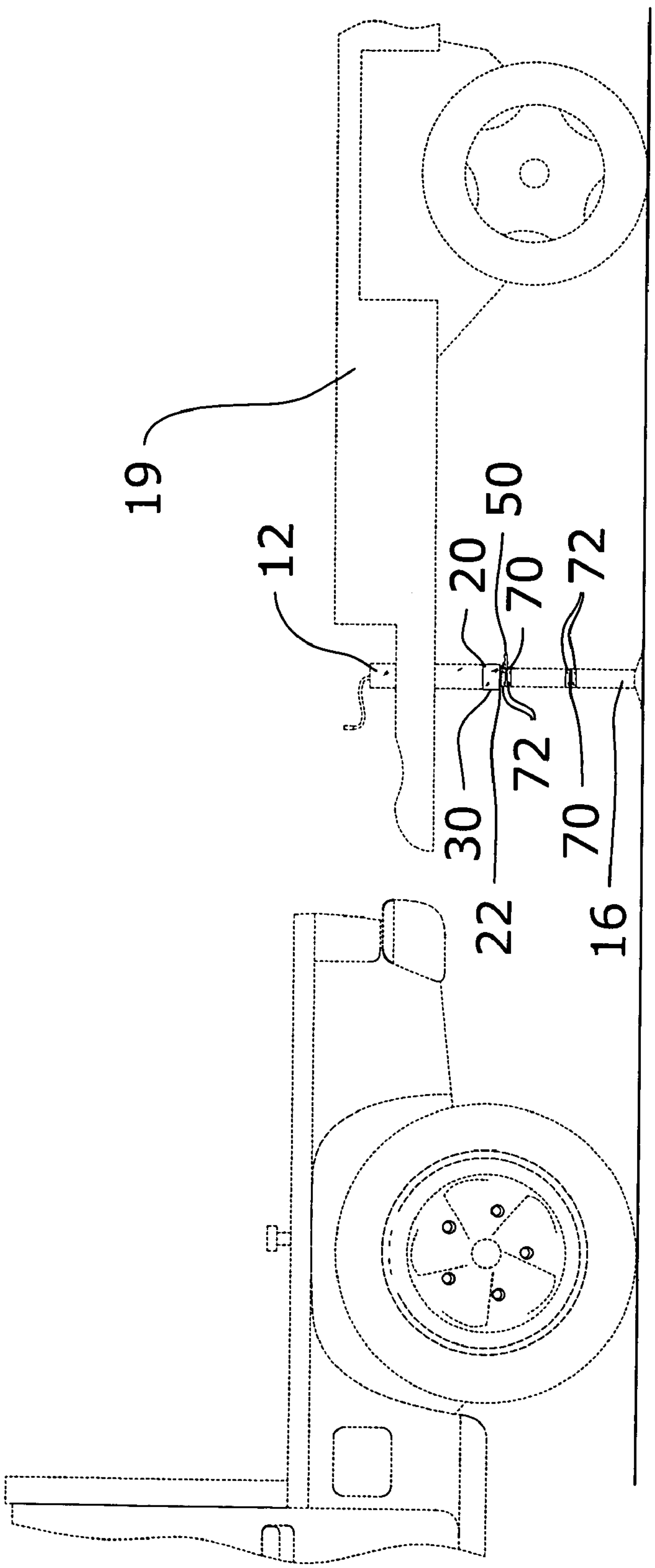
FIG. 12 is a side view of the present invention attached to a conventional trailer.

After the housing structure 20 and the indicator line 70 are properly attached to the leg of the trailer 19, the hitch of the trailer 19 is adjusted to a desired vertical height for attaching the trailer 19 to a vehicle (or the trailer 19 is allowed to be retained in an attached position to the vehicle. The measuring member 40 is then extended from the housing structure 20 until the pointer member 50 is vertically aligned with the indicator line 70 as shown in FIGS. 1, 3 and 11 of the drawings.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A trailer hitch alignment system for use with a trailer, comprising:

a housing structure attachable to a leg of a trailer;

a measuring member extendable from said housing structure, wherein said measuring member extends downwardly in a vertical manner;

a pointer member attached to a distal end of the measuring member; and an indicator line attachable to a telescoping portion of said leg of a trailer, wherein said indicator line extends along a substantially horizontal plane.

2. The trailer hitch alignment system of claim 1, including a securing member for securing the housing structure to an upper leg portion of said leg of a trailer.

3. The trailer hitch alignment system of claim 1, wherein said pointer member is aligned with said indicator line when said trailer is at a desired vertical height.

4. The trailer hitch alignment system of claim 1, wherein said housing structure includes a locking button for locking a position of said measuring member.

5. The trailer hitch alignment system of claim 1, wherein said measuring member is comprised of an elongated flexible member.

6. The trailer hitch alignment system of claim 5, wherein said measuring member is comprised of a tape measure.

7. The trailer hitch alignment system of claim 6, wherein said housing structure includes a coil unit for dispensing and retracting said measuring member.

8. The trailer hitch alignment system of claim 1, wherein said housing structure includes a first side and a second side for being positioned upon sides of an upper leg portion.

9. The trailer hitch alignment system of claim 8, including a spacer member having a concave depression positionable between said first side and said second side.

10. The trailer hitch alignment system of claim 1, wherein said housing structure includes a plurality of mounting flanges.

11. A method of operating a trailer hitch alignment system, said method comprising:

attaching a housing structure to an upper leg portion of a support leg of a trailer;

attaching an indicator line to a telescoping portion of said support leg;

elevating a hitch of said trailer to a desired vertical height for attaching said trailer to a vehicle; and extending a measuring member from said housing structure until a pointer member attached to a distal end of said measuring member is vertically aligned with said indicator line.

12. A trailer hitch alignment system for use with a trailer, comprising:

a housing structure attachable to a leg of a trailer, wherein said housing structure includes a first side and a second side for being positioned upon sides of an upper leg portion, and wherein said housing structure includes a plurality of mounting flanges;

a measuring member extendable from said housing structure, wherein said measuring member extends downwardly in a vertical manner, wherein said measuring member is comprised of an elongated tape measure;

a spacer member having a concave depression positionable between said first side and said second side;

wherein said housing structure includes a coil unit for dispensing and retracting said measuring member;

a pointer member attached to a distal end of the measuring member;

an indicator line attachable to a telescoping portion of said leg of a trailer, wherein said indicator line extends along a substantially horizontal plane and wherein said pointer member is aligned with said indicator line when said trailer is at a desired vertical height;

a securing member for securing the housing structure to an upper leg portion of said leg of a trailer; and wherein said housing structure includes a locking button for locking a position of said measuring member.

* * * * *